3,061,023
SHAFT JUMBO DRILL APPARATUS
Donald F. Samhammer and George E. Hepola, Utica, N.Y., assignors to Chicago Pneumatic Tool Company, New York, N.Y., a corporation of New Jersey
Filed Apr. 7, 1958, Ser. No. 726,927
17 Claims. (Cl. 175—86)

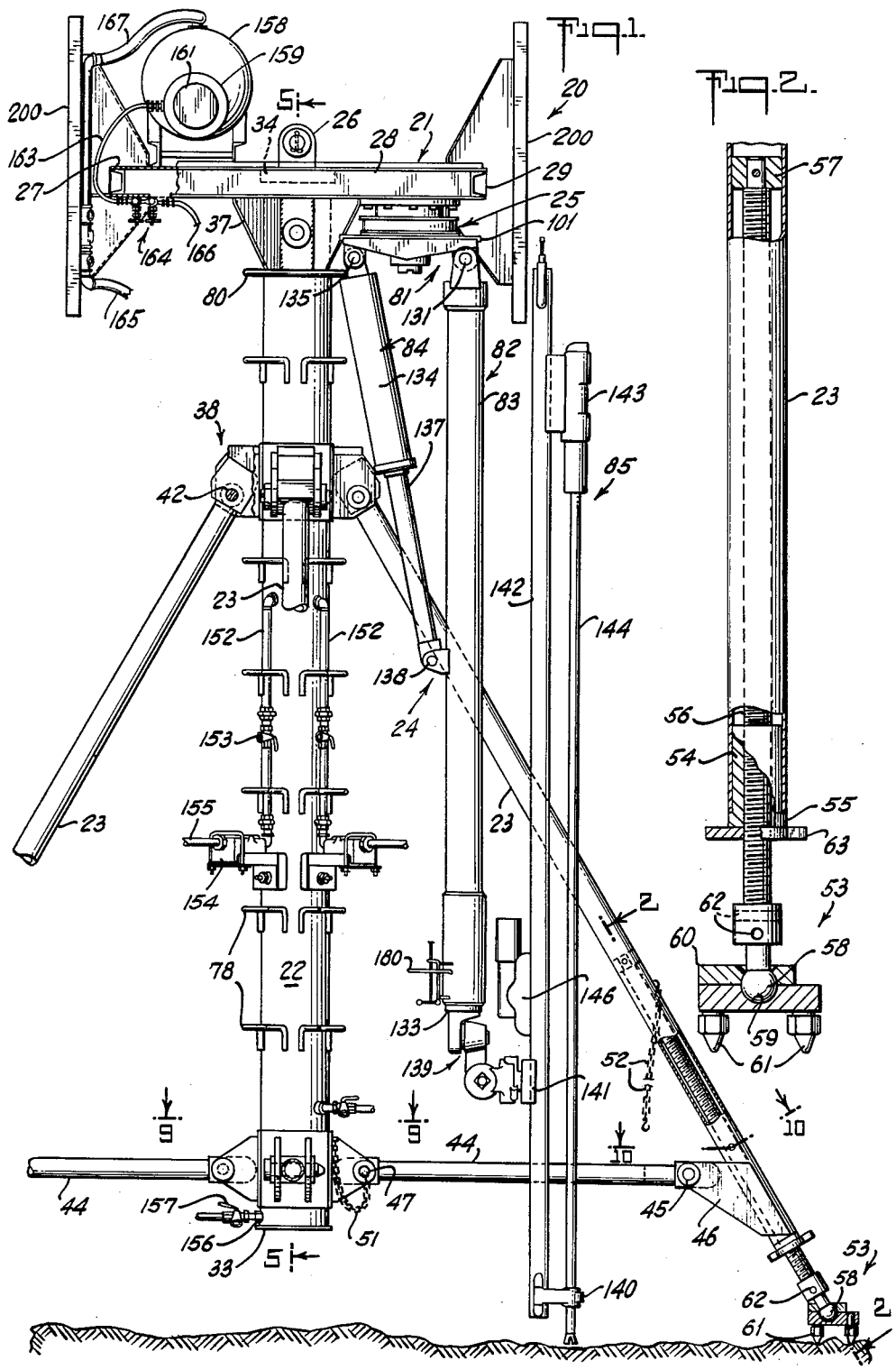

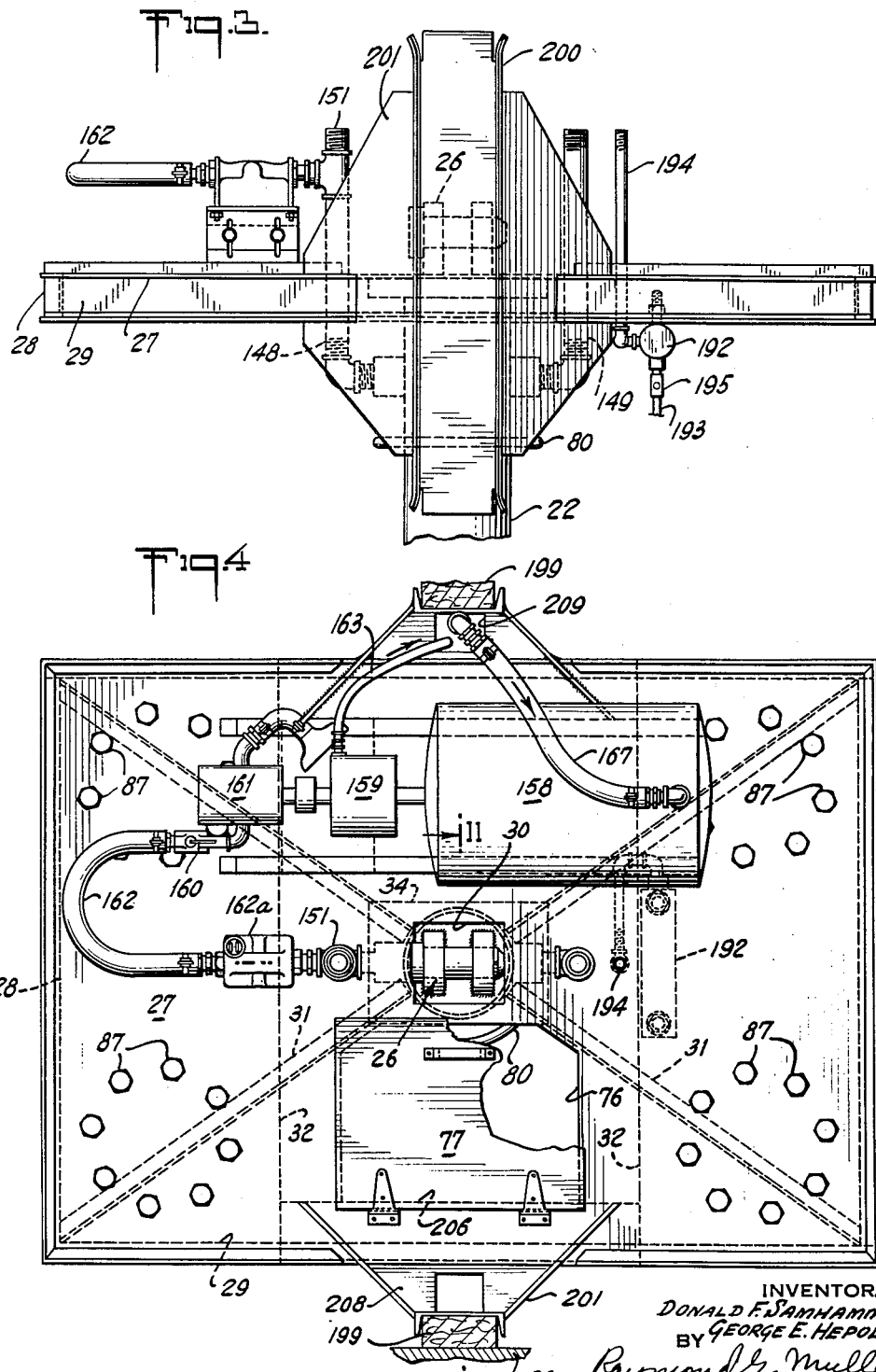

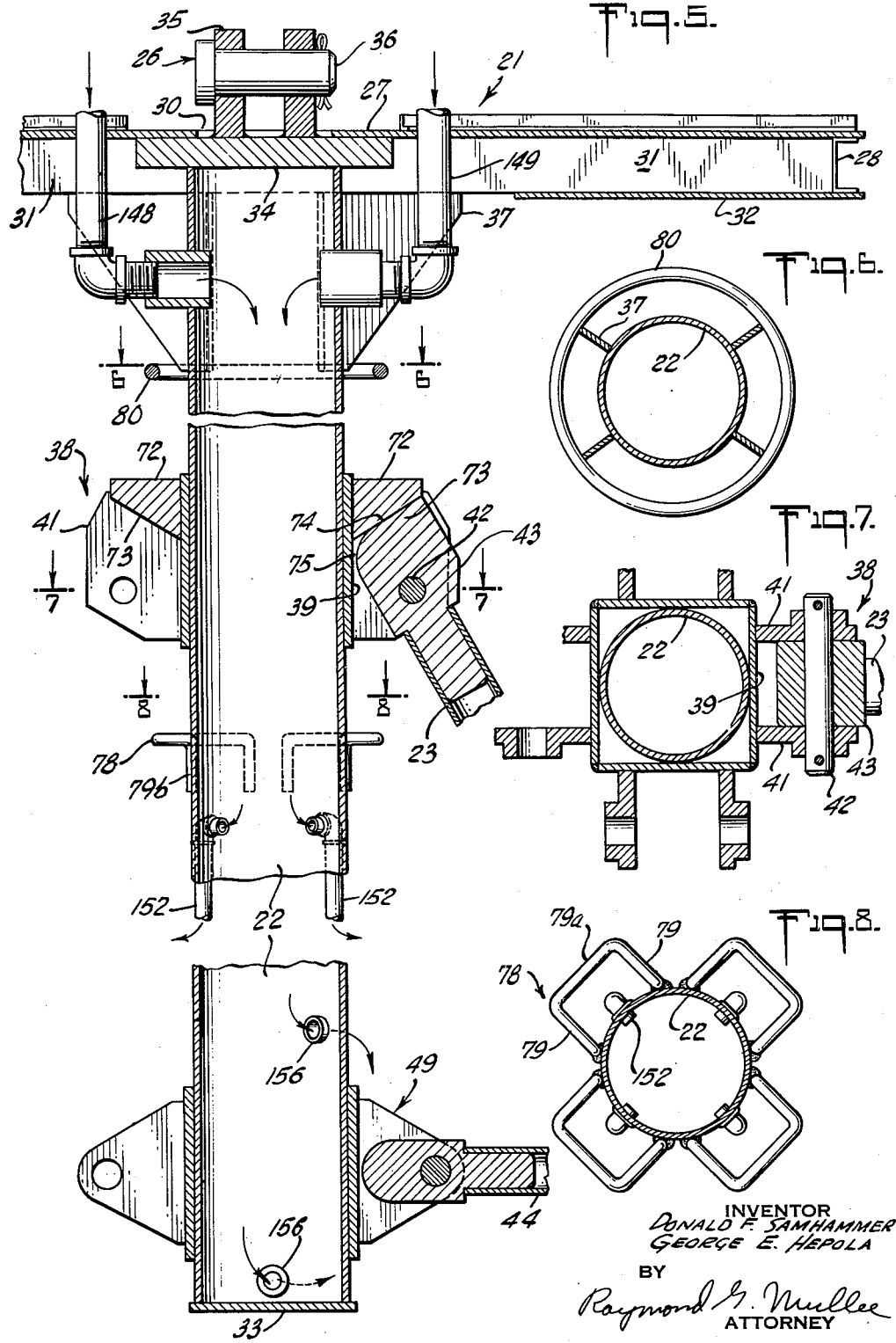

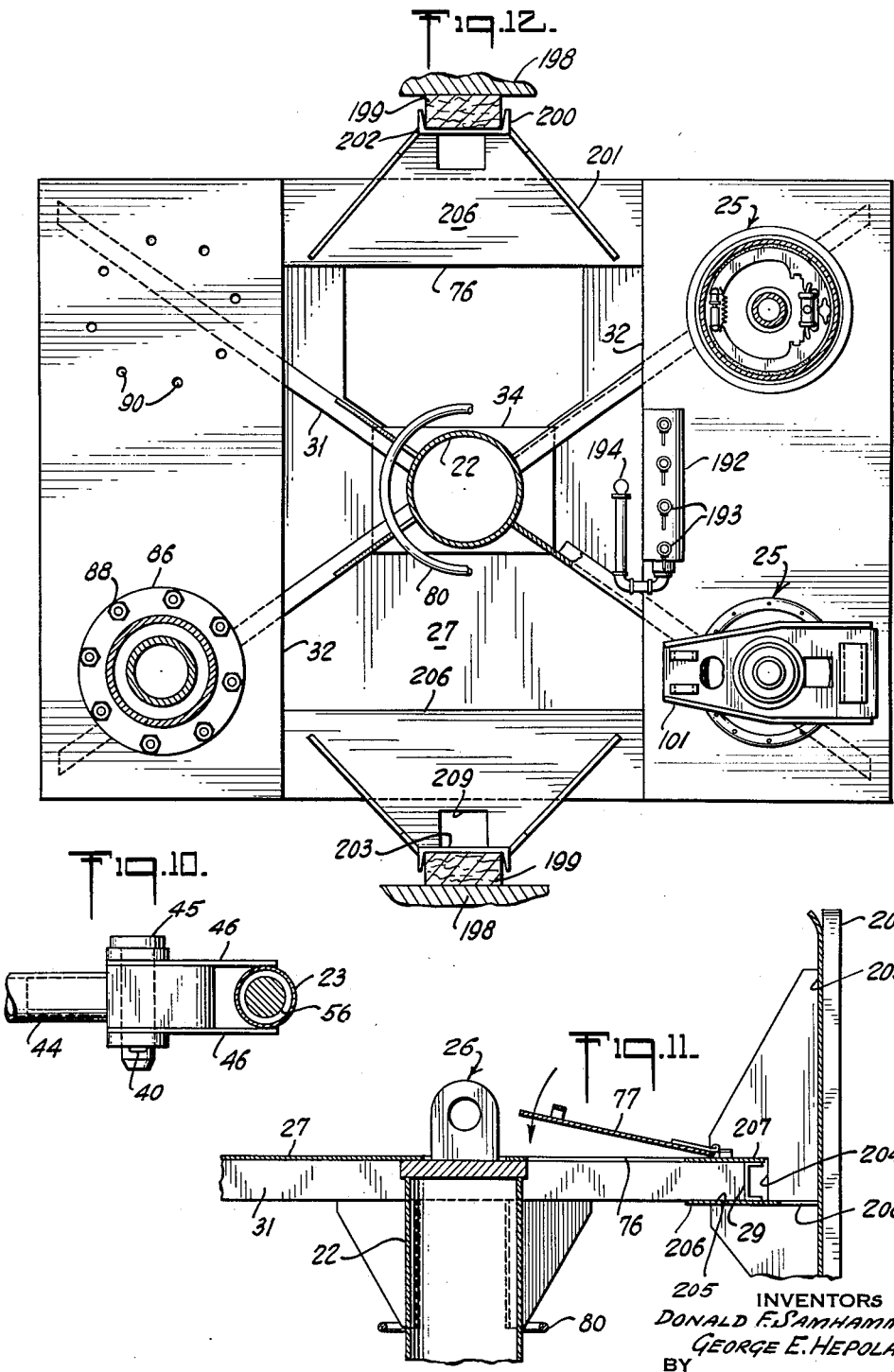

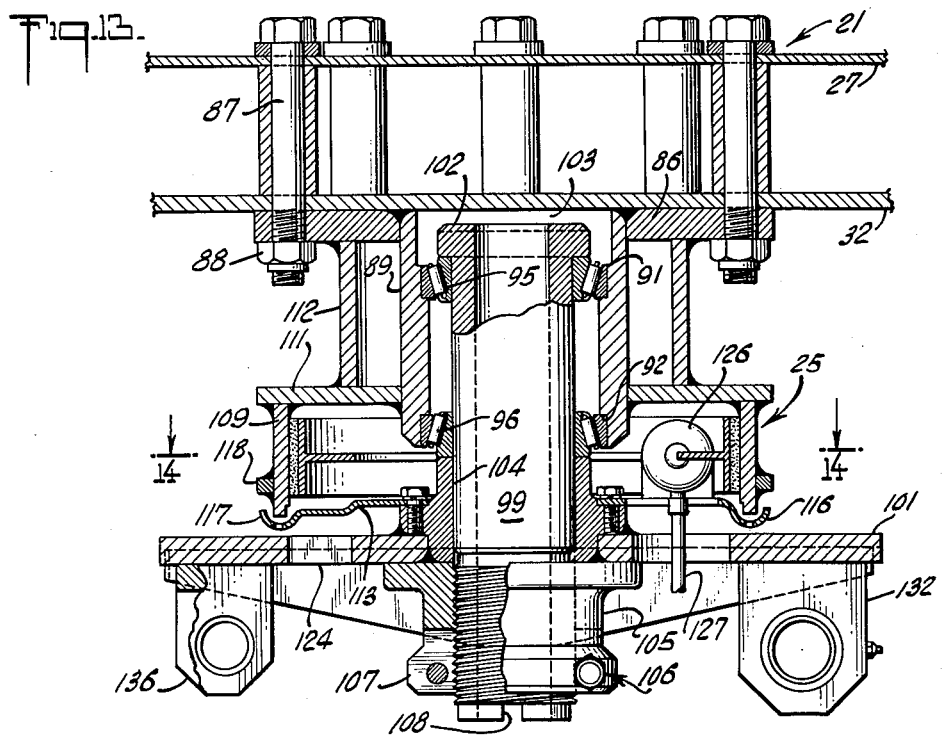
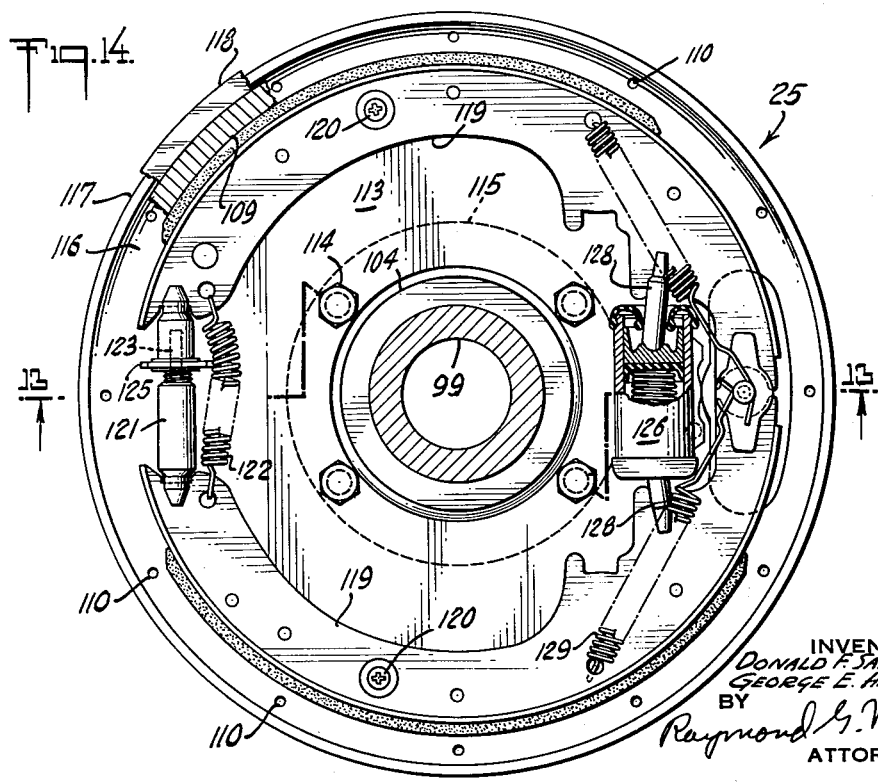

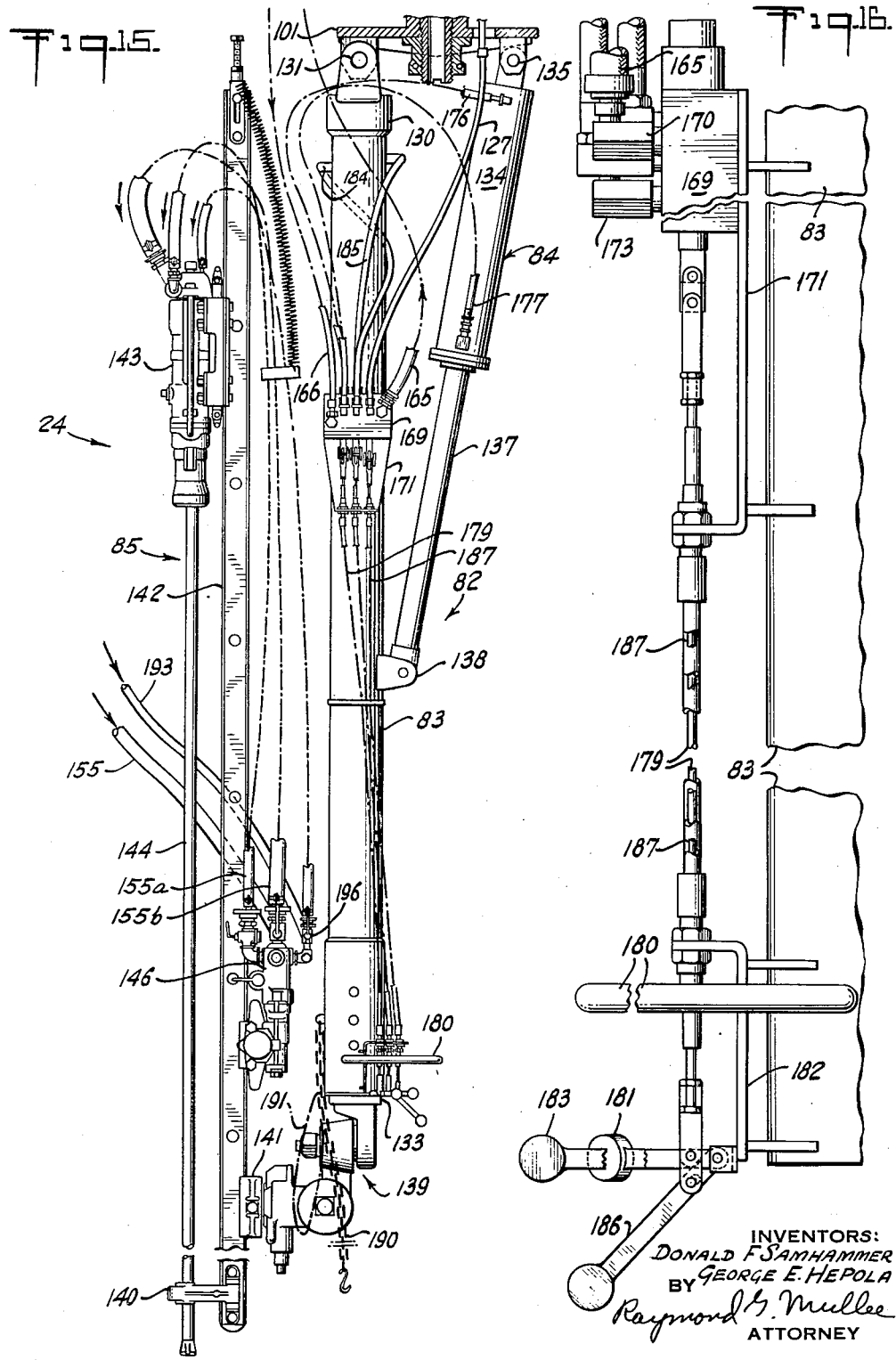

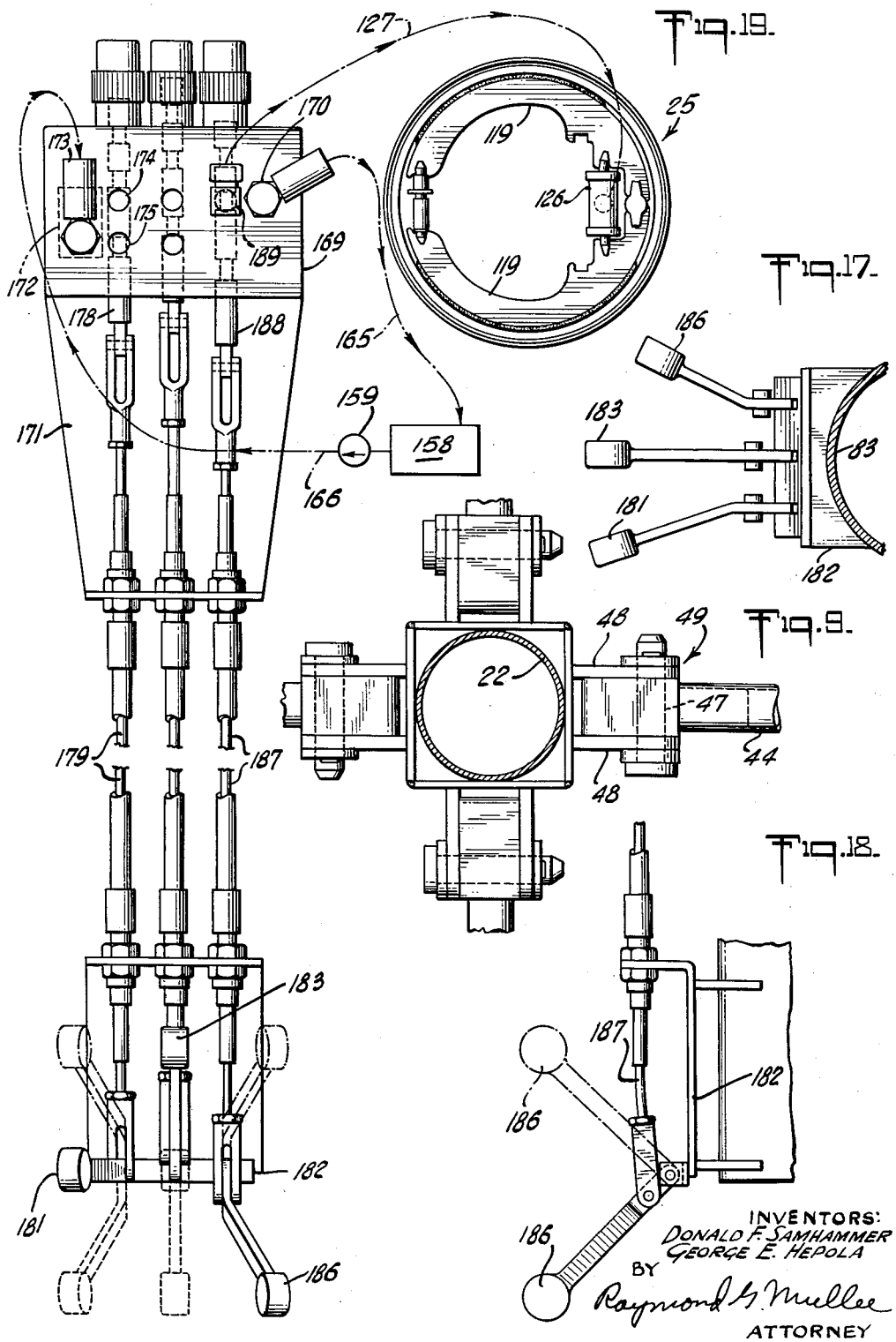

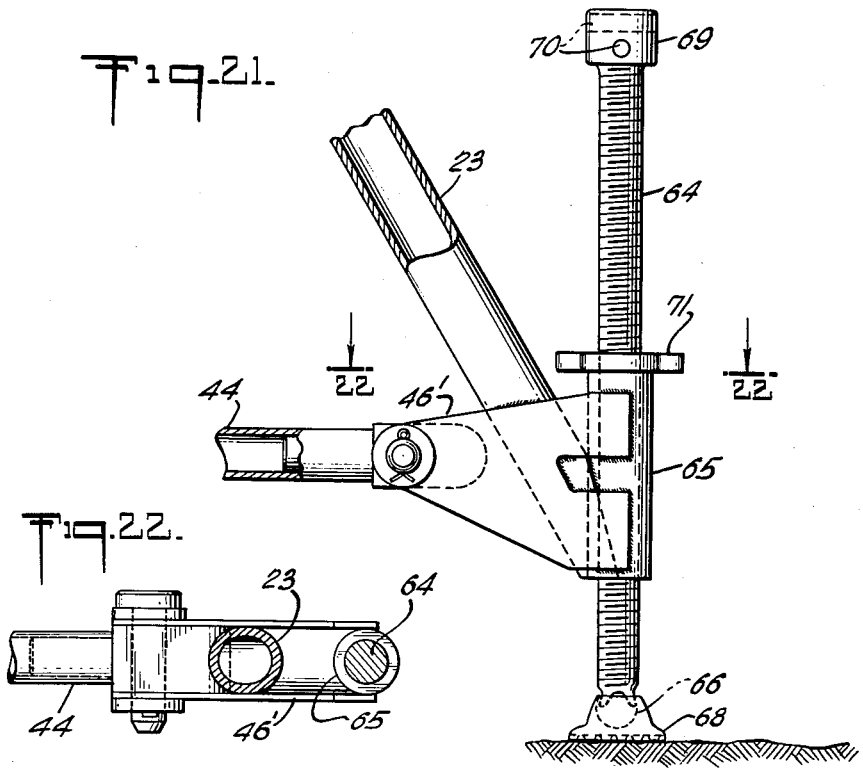

This invention relates to jumbo size drill apparatus of a type which finds particular use in drilling in rock deep vertical shafts of relatively wide diameter, which carries a number of boom-drill sets for this purpose, and which is adapted to be lifted, lowered or moved about by a hoist. More particularly, this invention is concerned with an improved jumbo size drill apparatus of this nature which has various desirable features and consequent advantages. The apparatus of the present invention is adapted to dig a hole some 22 feet in diameter and 2,000 feet and more, deep. It is adapted to be moved down into the shaft as the shaft deepens.

A feature of the invention lies in the general overall construction of the apparatus whereby a safe and practical structure of this nature is provided. It is balanced in its structure and in the arrangement of a plurality of boom-drill sets thereon, whereby its presents no difficulties of imbalance or dangers when in use or when it is being raised, lowered or moved about by a hoist.

Another feature of the invention is a desirable arrangement of various pressure fluid supply devices and flow controls for operating associated devices, whereby crowded and low hanging hose supply lines are avoided, thus enabling greater maneuverability in the shaft being dug by the various boom-drill sets supported by the apparatus, as well as easier and safer movements of the miners about the apparatus.

Another feature of the invention is provided by various securing elements, whereby various parts are restrained against dangerous movement while the apparatus is being hoisted.

Another feature of the invention lies in the provision of a supporting center column whereby the usefulness of the apparatus is materially improved. The center column is made to function as a ladder for means of ascent and descent to and from a deck at the top of the apparatus. It is further made to function as a pneumatic supply reservoir or manifold having a plurality of desirably located taps from which various associated pneumatically powered devices can be supplied. A further advantage of the center column is its elevated condition relative to the ground whereby drilling operations may be effected directly below the column without moving the apparatus.

A still further feature of the invention lies in a swivel brake control mounting arrangement for each boom-drill set, whereby each boom-drill set is individually rotatable, selectively positionable, and capable of being locked in its selected position.

A further feature of the invention is a desirable arrangement of leg members whereby the apparatus is supported upon the ground and whereby the central column is maintained erect and elevated relative to the ground. Because of this advantageous arrangement, a hoist is not required for support nor are supporting braces required to extend from the apparatus to the side walls of the hole.

A particular feature of the leg structures lies in their adjustable nature whereby they may be selectively adjusted in length so as to level the apparatus as needed. Their length may be further adjusted so as to maintain the bottom of the center column at a desirable distance above the ground.

A further feature of the legs is their particular manner of attachment to the apparatus. They are pivotally connected to the center column whereby they may be angularly extended for purposes of support or may be angularly collapsed to a narrow vertical position when the apparatus is being raised or lowered. Another feature is a bracket arrangement associating the legs with the center column whereby thrust loads acting upon the legs are transmitted in large measure to a center point of the column.

Another particular feature of the legs lies in a desirable foot assembly at the end of each leg. One feature of each foot assembly lies in its structure whereby it grips the ground and prevents creeping of the apparatus on the ground. Another feature of each foot assembly is its manner of association with its leg whereby the latter may be readily adjusted in length while the foot assembly is engaged with the ground.

A particular feature of the center column is a cap which seals its top end and is associated with a clevis, whereby in hoisting operations the load of the apparatus and the pull of the hoist is sustained by this cap.

Another particular feature of the center column is an arrangement of steps or rungs about the column which define a ladder as a means of ascending and descending to and from a deck at the top of the apparatus. In this respect the steps are of a particular advantagesous construction whereby a firm anti-skid grip thereon is afforded to the climber. Access to and from the steps at the deck end thereof is provided by a protectively covered manway through the deck.

A general object of the invention is, therefore, to provide an improved shaft jumbo type drill apparatus which reduces the common hazards of such structures to a minimum, is easily maneuverable, and is practical for the purposes intended.

A more particular object of the invention is to provide an improved and practical supporting structure in a jumbo size drill apparatus for supporting the various associated tools thereof.

A still further object of the invention is to provide a practical and advantageous arrangement of various pressure fluid supply lines and associated controls which will not interfere with work operations or the safety of the workers and which will promote greater maneuverability of the variously associated tools.

Another object of the invention is to provide an improved and practical mounting arrangement of individual boom-drill sets to the supporting structure.

A still further object of the invention is to provide in a jumbo size drill apparatus having an overhead deck, a plurality of swivelly mounted depending boom-drill sets and a collapsible supporting leg arrangement whereby the boom-drill sets may be swivelled to a desirable position below the deck and the legs may be collapsed to a vertical condition below the deck so that in hoisting operations the apparatus may be easily lowered or removed from a shaft without interfering with cross heads arranged about the surface end of the shaft.

Another object of the invention is to provide in a jumbo size drill apparatus a center column which serves as the center of support of the apparatus in hoisting operations; and functions as a pneumatic reservoir, a ladder, and as a support for a plurality of legs intended to bear the assembled weight of the apparatus and intended to hold the center column in an elevated position relative to the ground.

The invention further lies in the general construction of its component parts and also in their cooperative association with one another to effect the results intended herein.

The foregoing and other features, objects and advantages of the invention will appear more fully hereinafter from a consideration of the detailed description which follows, taken together with the accompanying drawings wherein an embodiment of the invention is illustrated. It is to be expressly understood, however, that the drawings are for purposes of illustration and description, and are not to be construed as defining the limits of the invention.

In the drawings:

FIGURE 1 is a view of the shaft jumbo drill apparatus in end elevation as viewed from the left end of FIG. 4;

FIG. 2 is a longitudinal section taken on line 2—2 of FIG. 1;

FIG. 3 is a side elevational view of the deck section;

FIG. 4 is a top plan of the deck;

FIG. 5 is a sectional detail taken on line 5—5 of FIG. 1;

FIG. 6 is a section taken on line 6—6 of FIG. 5;

FIG. 7 is a section taken on line 7—7 of FIG. 5;

FIG. 8 is a section taken on line 8—8 of FIG. 5;

FIG. 9 is a section taken on line 9—9 of FIG. 1;

FIG. 10 is a section taken on line 10—10 of FIG. 1;

FIG. 11 is a detail section taken on line 11—11 of FIG. 4, showing the manway cover slightly lifted;

FIG. 12 is a bottom plan of the deck showing sections at different levels of the association of the mounting assemblies with the deck; showing at the upper left, the holes for accommodating a mounting assembly; at the lower left, the mounting plate; at the upper right, the brake mechanism; and at the lower right, the swivel plate;

FIG. 13 is a section taken on line 13—13 of FIG. 14 detailing the mounting assembly for a boom drill set;

FIG. 14 is a section taken on line 14—14 of FIG. 13 detailing the hydraulic brake mechanism of the mounting assembly;

FIG. 15 is an elevational view of one of the boom-drill sets, and is directed to showing the elevated arrangement of the hydraulic lines on the boom and the remotely located operating controls at the bottom thereof;

FIG. 16 is a fragmentary side view of the boom in FIG. 15 directed to the remote operating control;

FIG. 17 is a bottom view of the remote control lever bracket;

FIG. 18 is a fragmentary detail illustrating a brake control lever in its normal actuated condition;

FIG. 19 is a schematic showing of the various positions of the remote operating control levers, and illustrates the association of a brake control mechanism with its hydraulic distribution unit;

FIG. 20 is a diagrammatic view of the area of ground coverage by the apparatus;

FIG. 21 is a modified form of the foot assembly associated with a leg member; and FIG. 22 is a section taken on line 22—22 of FIG. 21.

Reference is now directed to the several drawings wherein there is shown a jumbo size drill apparatus embodying the invention, which finds particular use in drilling into rock deep vertical shafts of substantial diameter. The apparatus includes a main supporting structure 20 having a horizontally disposed platform or deck 21 mounted centrally atop an elongated vertical center post or column 22 which in turn is supported by a plurality of angularly extendible legs 23, here, four in number, three being shown in FIG. 1. The deck supports at its underside a plurality of pressure fluid operated boom-drill sets 24, here, four in number, one of which is shown in FIG. 1 and further detailed in FIG. 15. Each of these is swivelled on a vertical axis below the deck and is adapted to be restrained in any selected rotated position by an associated pressure fluid operated brake mechanism 25. The supporting structure 20 serves to support various pressure fluid supply devices for supplying operating fluid to the several boom-drill sets. A clevis 26 projecting vertically above the deck from the center of the supporting structure 20 is engageable by a hoist whereby the entire apparatus, together with the various members supported by it, may be lifted, lowered or ported and located where desired.

Here, the deck 21 is rectangular in form, having a rectangular floor or upper plate 27 which is fixed to an under-frame. The under-frame has side and end supporting channel members, respectively 29 and 28, and diagonally extending channel members 31 (FIGS. 4, 5). The deck is further strengthened by a pair of spaced end or lower plates 32 fixed to the undersides of the several channel members. The center column 22 is a hollow cylinder sealed over at opposite ends by plates 33 and 34 fixed thereto. Plate 34 caps the top of the column. It is relatively thick and rectangular in form. It is fixed to the center underside of the floor plate 27. The clevis 26, which is formed by a pair of parallel uprights 35 fixed to the top of cap plate 34, projects above the floor plate 27 through a small hole 30 in the latter. The clevis includes a cross pin 36 to which a hoist cable may be anchored. The diagonal channel members 31 are fixed at their inner ends in abutting relation to the outer surface of the center column. Gussets 37 fixed to the diagonal channel members and to the outer surface of the center column further strengthen the association of the latter and the deck to one another.

The depending center column is supported in vertically erect position by the legs 23 (FIGS. 1, 2, 5, 7). Each leg is pivoted at its upper end in a separate bracket 38. These brackets are arranged circumferentially about the center column in the same plane at a short distance below the deck, and they are centered 90 degrees apart. Each bracket includes a back or box plate 39 fixed to the center column, and a pair of parallel bearing flanges 41 which support between them a pivot pin 42 for the associated leg. Each leg is tubular, and has a cap 43 fixed over its top end which supports the leg between the flanges for pivot movement on pin 42. The flanges 41 of the bracket extend radially from the center column, and the arrangement of the pivot position of the leg in the flanges of the bracket is such that the legs when collapsed or folded, have a vertical position in close parallel relation to the center column. From this latter position, the legs are pivotable angularly outward to the position shown in FIG. 1. The legs are relatively longer than the center column so that in their vertical collapsed position, as well as in their fully angularly extended position, the center column is supported clear of the ground. This elevated condition of the center column from the ground level is desired, as it enables drilling operations in the ground area directly below the column without necessitating removal of the overhead structure.

Each leg is locked against moving from its angularly extended position by a separate brace 44 (FIGS. 1, 5, 9, 10). One end of the latter is pivoted on a cross pin 45 supported between a pair of parallel anchor plates 46 fixed near the lower end of the associated leg. A cotter pin 40 retains the position of the cross pin. The opposite end of the brace is pivoted on a cross pin 47 supported between a pair of side flanges 48 of a bracket 49 fixed to the lower area of the periphery of the center column. The cross pins at both ends of the brace are removable to permit ready removal of the leg braces when required. In practice, however, the inner pins 47 of the several legs are adapted to be removed to permit collapsing of the legs to vertical position preparatory to elevating or lowering the legs into a shaft, or when shipping the apparatus. A separate chain 51, one of which is shown, is associated with each bracket 49. It is linked at one end to the bracket and linked at the other to the cross pin 47. It serves to keep the latter against loss subsequent to its removal from the brace. The brace anchor plates 46 extend radially inward, and the arrangement of the pivoted end of the associated brace 44 between them is such that the brace is pivotable up or down into parallel close relation to the leg. The brace at times is pivoted upwards when collapsing the related leg, and is held when so pivoted, to the latter by a wrap-around chain 52 anchored at one end to the leg. The arrangement of the cross pins 45, 47 and their associated brackets is such that each brace in the angularly extended position of its associated leg is maintained at right angles to the center column, thus materially strengthening the legs against inward collapse under the load of the entire apparatus as well as under the added thrust developed by the several boom-drill sets during operation.

Each leg is provided with a foot assembly 53 (FIGS. 1, 2) which functions to provide a secure footing for the overhead structure, and which is adjustable, when required because of an uneven ground surface, to obtain a level condition of the deck 21. It is desired that the deck have a level condition to assure a firm ground hold of the entire structure during work and drilling operations. To accommodate the foot assemblies, the legs 23 are hollow and open in their bottom ends. A foot assembly includes an internally threaded short sleeve 54 which is fixed in the bottom end of the leg and has a radially enlarged external head 55 which abuts the end wall of the leg. An end of an elongated adjusting screw 56 is threadedly received through sleeve 54 axially into the interior of the leg. A head 57 pinned upon the inner end of the screw is adapted to ride over the interior wall of the leg as a support for the screw. In a fully axially extended condition of the screw the head end 57 thereof is adapted to abut against the inner end of the sleeve 54, thus preventing escape of the screw from the leg. The screw terminates at its lower end in a ball head 58. The latter is retained in a socket 59 of a foot piece 60, and forms with the socket a universal joint. The foot piece has a plurality of cone shaped teeth 61, here three, two being shown, which depend in triangular relation from the underside thereof. These are adapted under the weight of the overhead structure to bite into the ground surface and thereby prevent creeping or slipping of the position of the overhead structure during drilling operations. Each leg is axially adjustable in length by threading screw 56 in or out of the leg as required, until a level condition of the deck is obtained. Cross holes 62, located through a thickened portion of the shank of the screw just above the universal joint accommodate a rod or tool handle for manually effecting rotation of the screw. The anchorage of the foot piece to the ground, and the associated universal joint enable rotation of screw 56 without consequent rotation of the foot piece 60. A manually operable winged lock nut 63 threaded on the external end of the screw is adapted, when tightened against the leg end 55, to lock the screw against further rotation.

The foot assembly may take the modified form shown in FIGS. 21, 22. In this form, the extensible elongated adjusting screw indicated at 64 is not axially threaded into the end of the associated leg. Instead, there is fixed on the outside of the lower end of the associated leg 23 an internally threaded open ended short cylinder 65 through which the screw is threadable. Anchor plates 46' pivotally supporting the brace 44 at one end strengthen the support of cylinder 65 to the leg 23. When the associated leg is angularly extended to its full radial distance from the center column, the short cylinder 65 and screw 64 therein will have the vertical position in FIG. 21. The bottom end of the screw terminates in a ball 66 which is retained for universal movement in a socket provided in a foot pad 68. The screw is formed with a thickened head 69 at its upper end having cross holes 70 which are adapted to accommodate a tool for turning the screw as desired in one direction or the other. A winged lock nut 71 on the screw is adapted, when threaded tightly into abutment with the adjacent end of cylinder 65, to lock the screw in its adjusted position.

Some of the load carried by each leg 23 reacts strongly against its pivoted upper end. The bracket 38 is here designed to reduce strain at this point upon the pivot pin 42 and to transfer it substantially to the center column 22. To this end (FIGS. 1, 5, 7), a block 72 is fixed between the top ends of the flanges of the bracket and is angularly thickened on its underside as at 73. The rear of this block is unitary with the back plate 39 of the bracket. The thickened portion 73 declines downward toward the center column. The declining undersurface of this thickened portion is at right angles to the longitudinal axis of the related leg when the latter is fully extended angularly outward, as in FIG. 1. The leg cap 43 forming the pivoted end of the leg has an end surface 74 which is adapted to abut flush against the underside 73 of the thickened portion upon pivoting of the leg to its angular position. To enable this abutment and pivoting, a rounded corner 75 is formed on the leg cap 43.

A manway 76 through the deck 21 (FIGS. 4, 11, 12) having a hinged protecting cover 77 for closing it when not in use, provides an exit or an approach to a series of steps mounted one below the other on the center column 22. The steps (FIGS. 1, 5, 8) provide a ladder for ascending and descending from the deck to the ground. The steps are defined by a plurality of hand grasps or rungs 78 mounted at opportune points to the center column. Each step 78 is formed from a length of sturdy, preferably rough, rod. It comprises a pair of short parallel spaced arms 79 disposed at right angles to the vertical of the center column 22, a bridge portion 79a connecting the outer ends of the arms, and a pair of depending leg portions 79b bent downwardly at right angles from the inner ends of the arms and welded to the surface of the center column. Conventional concrete re-inforcing rod is desired as the material forming the steps, as it is rough and strong. It provides a non-slip gripping surface for the hands and feet of the climber.

The steps are arranged in a desirable manner upon the column whereby access to the various parts of the apparatus may be had by the climber in a longitudinal direction as well as in a circumferential direction through 360 degrees about the column. To this end (FIGS. 1 and 8), the steps are arranged one above the other in four rows centered 90 degrees apart. Further, each step is one of a group of four arranged in the same horizontal plane about the column, as appears in FIG. 8. A ring 80 surrounding the center column and fixed to the under ends of the gussets 37 forms the top step. It also is preferably formed of concrete reinforcing rod.

As earlier mentioned, the deck 21 serves as a support for four boom-drill sets 24 (FIGS. 1, 4, 12, 15, 20). These are supported in equal spaced relation to the center column and away from opposite areas of the latter, so that a pair of boom-drill sets located in one direction from the center column balances the weight of a similar pair identically located in the opposite direction. The balanced arrangement of the boom-drill sets facilitates vertical lifting and lowering of the entire structure by a cable hoist, as it maintains the deck level and the center column in vertical condition.

Each boom-drill set includes (FIG. 1) a swivel frame mounting assembly 81, a brake mechanism 25 associated with the latter, a boom assembly 82 including a boom 83 and a lift cylinder or jack 84 for effecting angular movement of the boom, and a suitable drilling apparatus 85 carried by the boom.

The swivel frame mounting assembly 81 (FIGS. 4, 12, 13) includes a mounting plate 86 fastened to the underside of a lower end plate 32 of the deck by a ring of headed bolts 87 and associated nuts 88. The bolts pass vertically through holes 90 in the upper and lower plates, and the nuts are tightened at the underside of the mounting plate upon threaded projection portions of the bolts. The mounting plate has formed centrally thereof an open ended depending stub cylinder 89. Counterbores in opposite ends of the latter provide a pair of annular shoulders 91, 92 on which the end walls of the outer races of a pair of roller bearing members 95, 96 rest. The inner races of the bearings support for rotation a vertical hollow stub shaft or axle 99 which serves as a vertical axis for a narrow and substantially rectangular swivel plate 101. An enlarged head 102 of the axle provides an annular under-shoulder which bears upon the end wall of the inner race of the upper bearing 95. The upper counterbore of the stub cylinder is sufficiently deep to provide a clearance 103 between the axle head 102 and the underside of the deck plate 32.

The swivel plate 101 is formed on its upper side with an open ended collar 104 which sleeves about the axle 99, and is adapted to limit at its upper end against the bottom end of the inner race of the lower bearing 96. A threaded portion of the axle projecting below the swivel plate accommodates a lock nut 105 having a radially enlarged top end face which is adapted, upon tightening of the nut, to press the swivel plate upward so as to limit its collar 104 against the lower bearing 96 and to draw the head end 102 of the axle down upon the upper bearing 95. By this arrangement the axle and swivel plate are rotatable together as a unit in the bearings. A pair of bolts and associated nuts 106 cooperating with split ends 107 of the lock nut, function, when tightened, to lock the assembled condition of the axle and swivel plate. The degree of tightness of the axle relative to the swivel plate and bearings may be adjusted, after loosening the bolts and nuts 106, by further tightening or loosening lock nut 105 as required. An end portion of the axle projecting below the lock nut is formed with cross slots 108 to accommodate the shank of a tool so as to hold the axle against turning while tightening the lock nut.

A hydraulically actuable brake mechanism 25 (FIGS. 14, 13) is provided to brake the swivel plate 101 in any selected rotated position. A brake drum is provided by an annular wall 109 spaced above the swivel plate 101 and having a coaxial spaced relation to the axle 99. The drum depends vertically from the underside of an annular upper covering plate 111 which extends radially from the periphery of the stub cylinder 89 to which it is fixed. A further support for the drum is provided by an annular wall 112 coaxial with the stub cylinder 89 and fixed at its lower and upper ends respectively to plate 111 and to the mounting plate 86.

The braking mechanism further includes a horizontally disposed backing plate 113 having a central opening, the marginal portion of which is fixed by a ring of screws 114 upon a radially extending shoulder 115 of the collar 104 of the swivel plate. The shoulder 115 is raised enough above the swivel plate so as to provide a desirable clearance of the backing plate 113 above the swivel plate 101 and below the brake drum 109. The peripheral marginal portion of the backing plate 113 provides an annular trough 116 which is spaced below the bottom end of the drum 109, and has an upturned marginal edge 117 which rises in close spaced relation to the periphery of the drum wall. An annular strengthening rib 118 is fixed about the periphery of the drum wall. A ring of holes 110 at the bottom of the trough 116 serves as a drain for any moisture that may accumulate at this point. The backing plate supports in the space provided between itself and the brake drum cover 111 conventional mechanism for braking the swivel action of the axle and swivel plate. This mechanism includes a pair of brake shoes 119 in conventional end to end opposed relation and pivoted on upright pins 120 fixed in the backing plate. The usual adjusting screw 121 is provided to adjust the spaced relation of a pair of corresponding ends of the brake shoes against the load of a coil spring 122. A slot 123 provided in the backing plate is located above a hole 124 in the swivel plate through which access may be had by an appropriate tool, such as a screw driver, to the usual adjusting wheel 125 carried by the adjusting screw. The usual hydraulic cylinder 126 is provided to operate the brake shoes, and is anchored to the backing plate 113. The hydraulic cylinder has a connection with a hydraulic fluid supply line 127 which passes through holes in the backing and swivel plates to a proper source. Hydraulic fluid fed to the cylinder 126 causes outward extension of a pair of piston members 128 thereof to spread the brake shoes apart into braking contact with the drum wall against the resisting load of a pair of coil springs 129. It is clear that application of hydraulic pressure fluid will cause the brake shoes to frictionally engage the drum wall 109 so as to restrain the swivel plate 101 against rotation on its axis.

The swivel plate 101 serves as a mount for the boom assembly 82 (FIGS. 1, 13, 15). The latter includes boom 83 defining an elongated main cylinder having a cap or fitting 130 sealing over its top end. This cap pivots on a pin 131 in bushings or bearings carried in a bearing block 132 (FIG. 13) depending integrally from the underside of one end of the swivel plate. The boom 83 has a normal vertically depending position on its pivot as in FIG. 1, and is adapted to be pivoted back and forth in a vertical plane. Telescoping into the bottom end of the boom cylinder is an axially extendible member 133 adapted, upon application of hydraulic fluid to suitable piston means in the boom cylinder, to be axially extended toward the ground, or returned into the cylinder.

The boom is caused to be actuated on its pivot in a vertical plane to and from normal position by an hydraulic jack 84. The latter includes a main cylinder 134 which is closed over at its top end and includes a lug which pivots on a cross pin 135 in bushings or bearings provided in a pair of depending parallel ears of a bracket 136 (FIG. 13) fixed to the underside of the opposite end of the swivel plate. Reciprocable in the jack cylinder 134 is a hydraulically operable piston carrying a piston rod 137 which extends through the bottom end of the cylinder and has its free end pivoted to a bracket 138 mounted to the boom cylinder. Extension of the piston rod forces the boom 83 angularly away from the vertical, and return of the piston rod draws the boom back again.

Carried at the bottom end of the telescoping member 133 of the boom is a universal joint fitting 139 which is adapted to be locked in any selected position. This fitting 139 is connected to a saddle 141 mounted on the lower end of the slide guide 142 of a conventional rock drilling apparatus 85. The drilling apparatus includes a pneumatically actuated rock drill 143 which may be of any type, here it is of the percussive type adapted to deliver a succession of impacts to an elongated drill steel 144. The latter is guided in its vertical movement, and is restrained against lateral play by a centralizer 140 mounted to the lower end of the guide slide. The rock drill 143 is arranged for conventional sliding movement along the guide slide toward and away from the ground. A pneumateically powered feed motor 146 arranged on the slide guide is adapted through a chain, not shown, or the like, to effect the sliding movement of the rock drill 143.

The center column 22, as earlier mentioned, is hollow and sealed at both ends. In a physical embodiment, it is approximately ten inches in diameter and about fourteen feet in height. These dimensions are mentioned as an indication of the jumbo size of the entire apparatus. Accordingly, it provides an interior chamber of substantial volume, which here serves as a pressure air supply reservoir for effecting operation of the various associated pneumatically powered devices. A pair of pressure air supply pipe lines 148, 149 (FIGS. 3–5) pass down through the central area of the deck 21 and tap at opposite areas into the upper end of the center column. These pipe lines are adapted at their upper ends 151 for connection above the deck to a suitable source of pressure air, such as an air compressor, not shown, which would be located on the ground surface. Because of the use of the center column as an air reservoir, the compressor can be located at a remote point from the shaft.

About midway of the center column are four outlet pipe lines 152, two of which are shown in FIG. 1. These tap into the interior of the column. These outlet pipe lines are spaced 90 degrees apart and extend down in parallel close relation to the center column for a short distance. Each outlet pipe includes a manually operable shut-off valve 153, and is intended to supply a separate one of the boom-drill sets 24 with the required operating pneumatic fluid. Each outlet pipe connects through a conventional oiler 154 bracketed to the center post, and from the oiler connects by a hose line 155 to the feed motor 146 and associated branch connections 155a, 155b to the rock drill 143 (FIG. 15).

Near the lower end of the center column 22 several outlet taps 156, are provided with appropriate manual shut-off valves 157. These are within hand reach of miners on the ground; and they enable connection therewith of hose lines for operation of various pneumatically powered tools by the miners at the base of the center column; such as hand drills, pumps, blowers, and the like, not shown.

Referring to FIGS. 1, 3, 4, 15, 16, 18, 19, the deck 21 further serves as a support for means for supplying the various hydraulically powered devices with operating fluid. To this end, there is mounted on the deck near an end thereof a hydraulic supply tank 158 which communicates with a hydraulic pump 159. The latter is driven by a motor 161 powered by pressure air from a branch line 162 of the main supply pipe 148. Line 162 includes a conventional oiler 162a and a hand control valve 160. The pump delivers hydraulic pressure fluid over a supply line 163 to manifold piping 164 supported by the underside of the deck. A separate hose line 166 leads from the manifold to each one of the boom-drill sets 24. A return hose line 165 from each boom-drill set serves to return the spent hydraulic fluid to the supply tank through a common main return line 167.

Referring to FIGS. 15–19, the hydraulic fluid supplied to each boom-drill set 24 is distributed to its associated hydraulicall yoperated devices from a distributor unit 169 which is supported by a bracket 171 to the surface of the upper end of the associated boom cylinder 83. This unit includes a non-return valved inlet 172, schematically shown in broken line in FIG. 19, connected by an inlet fitting 173 to an associated supply line 166. It further includes a pair of ports 174, 175 connected respectively by hose lines 176, 177 to serve the jack cylinder 134. A three positionable slide valve 178, actuable to its various positions by a push-pull wire 179 extending down the boom and connected to a hand lever 181 pivoted in a bracket 182 mounted to the lower end of the boom, controls hydraulic flow through the hose lines 176, 177. In the down position of the valve, as indicated by the lowermost position of the hand lever 181 in broken line, hydraulic flow is applied to cylinder 134 over line 176 to effect axial extension of the piston rod 137. In the uppermost indicated position of lever 181, hydraulic fluid is applied to cylinder 134 over line 177 to effect return of the piston rod. As one hose line is applying fluid to the cylinder, the other line serves to return fluid from the opposite end of the cylinder. In the middle or neutral position of lever 181, the hose lines are blocked against returning or applying fluid to the cylinder, whereby the piston rod is locked against extension or return.

A similar arrangement of a second hand lever 183 pivoted in bracket 182 controls hydraulic flow over lines 184, 185 to the boom cylinder 83; so as to effect in the down position of the lever, extension of member 133; in the opposite up position, return of member 133; and in the neutral middle position, locking of member 133 in its then particular position.

A substantially similar arrangement is provided in effecting hydraulic operation of the brake mechanism 25. In this arrangement, a third hand lever 186 pivoted in the bracket 182 controls through a push-pull wire 187 a slide valve 188 which controls hydraulic flow through a port 189 connected by hose line 127 to the brake cylinder 126. Lever 186 has a normal down position shown in full line, and an up or released position. In the normal position, hydraulic fluid is applied over line 127 to the brake cylinder so as to cause the brake shoes 119 to be extended to braking condition, whereby swivel action of the swivel plate 101 and, as a consequence, the associated boom-drill set 24 is restrained. In the released position, the hydraulic fluid returns from the brake cylinder 126 over line 127 to the distribution unit, thus releasing the brake shoes, whereupon the associated boom-drill set may be selectively swiveled by manual power to a desired position. Spent hydraulic fluid returned to the distributor unit 169 by various associated hose lines is returned through an outlet fitting 170 and the associated return line 165 to the tank 158. A guard ring 180 affixed to the boom protectively surrounds the hand levers against accidental operation or damage by moving objects. By this remote control arrangement, the hydraulic hose lines are located at the distributor unit 169 upon the boom well out of the way of any workers below.

A safety chain 190 anchored at one end to the boom 83 is adapted to be looped around the extendible member 133 and hooked into itself, as indicated by the broken line 191 in FIG. 15. This precaution is taken to prevent member 133 from creeping outward while the entire apparatus is being hoisted.

A water manifold 192 (FIGS. 3, 4, 12, 15) having a separate hose line connection 193 with each of the boom-drill sets is mounted to the underside of the deck and has an inlet supply pipe line 194 extending above the deck. Easily accessible valves 195, 196 located respectively at the manifold and at the drill apparatus 85 control water flow to the associated boom-drill set.

Each of the boom-drill sets 24 has a depending vertical normal position below the deck and between a pair of leg members 23 (FIG. 1). By means of the swivel mount 81 and the jack 84 it is possible to carry the drill apparatus 85 in an arc overlapping the ground areas between adjacent legs. It is also possible by means of the universal joint 139 connecting the drill apparatus 85 to the boom assembly 82 to incline the apparatus to enable drilling in the ground area directly below the center column 22. By means of the axial extendible member 133 of the boom it is possible, together with the swivel action of the boom-drill set, to drill substantially beyond the deck 21 in a wide arc. By this arrangement, a shaft or hole of wide diameter and great depth may be rapidly effected when all drills are in operation. Further, when one or more of the boom-drill sets is for some reason not operating, one of the others may serve to substantially cover its area. This all may be done without removing the apparatus or adjusting it from its initial position.

FIG. 20 is a diagram illustrating the roundness of a shaft or hole 197 which the apparatus is able to drill. This hole is about twenty-two feet in diameter. The rectangle designates the deck 21. Points A, B, C and D designate the pivot points of the individual boom-drill sets 24. It is noted that points A and C are diagonally opposite each other, and that points B and D are diagonally opposite each other, thus providing a balanced arrangement relative to the deck.

The limits of the radial extension of each boom-drill set are indicated respectively by the radii A–1, B–1, C–1 and D–1. The segment arc A–1, A, A–2 indicates the area over which the drill-boom set pivoted at A is capable of drilling, and segments B–1, B, B–2; C–1, C, C–2; and D–1, D, D–2 indicate the areas coverable respectively by boom-drill sets pivoted at points B, C, and D. It is also to be noted that the area covered by each boom-drill set overlaps portions of areas covered by the other boom-drill sets.

Referring to FIGS. 1, 3, 4, 11 and 12, cross heads 198 are employed as a means for guiding the entire apparatus as it is entered into or lifted out of a shaft. The cross heads are arranged about the top end of the latter. These include a pair of opposed vertical runners or tracks 199 arranged at the open end of the shaft. The deck 21 supports off the center of each of the longer sides thereof a vertical channel member 200. Each of the latter is adapted to ride over one of the tracks as the apparatus is lifted out of or lowered into the shaft.

Each channel is supported to the deck and held in spaced relation thereto by a pair of gussets 201. Each of the latter is fixed along a vertical outer edge 202 to the spine 203 of the channel. The opposite outer edges of the gussets are each centrally formed with a substantially square notch or cut-out 204 in which the adjacent side of the deck is received. The lower edges 205 of the cut-outs underlie and are welded to narrow longitudinal bottom plates 206. The latter are fixed between the end plates 32 to the underside of the frame members 29. The upper edges 207 of the cut-outs of the gussets overlie and are welded to the deck plate 27. Each channel is further made secure to the deck by a lateral extension 208 of the assoicated bottom plate 206 which fills the area between the gussets. A hole 209 is provided in this extension to permit passage of hose lines or the like, as appears is FIGS. 1 and 4.

While an embodiment of the invention has been illustrated and described in detail, it is to be expressly understood that the invention is not limited thereto, and it is our intent, therefore, to claim the invention not only as shown and described but also in all such forms and modifications thereof as may be reasonably construed to fall within the spirit of the invention and the scope of the appended claims.

What is claimed is:

1. In a shaft jumbo drill apparatus adapated to be lowered by cable down into a deep shaft, a horizontal deck, an elongated vertical hollow column supporting the deck and affixed at its upper end centrally to the deck, sealing means closing over opposite ends of the column to form a reservoir, a pressure air supply inlet pipe connected with the upper end of the column, and one or more outlet taps from the reservoir at lower areas of the column, each having a hose line fitting adapted for connection with a pneumatically operable tool, the deck extending radially in all directions substantially beyond the column and the column being relatively narrow as compared with the breadth of the deck, a manhole in the deck allowing access to the column, and rung elements mounted on the column along the surface thereof and circumferentially thereof at predetermined points defining a ladder below the shelter of the deck allowing sheltered descent of a worker from the manhole over any area circumferentially of the column to the bottom end of the latter.

2. In a shaft jumbo drill apparatus, horizontal deck, a plurality of pneumatically operable drill units swivelled to the underside of the deck and arranged in equally spaced relation to each other and in equally spaced relation to the center of the deck, each drill unit having a depending normal vertical position below the deck, an elongated vertical hollow column depending from the center of the deck and centrally of the drill, sealing means closing over each end of the column whereby a reservoir is provided by the latter, a pressure air supply inlet to the reservoir, and a plurality of outlet taps from the reservoir each adapted for connection to one of the drill units; wherein the sealing means closing over the top end of the column is a thick cap integral with the column and with the underside of the deck, and wherein a clevis projecting integrally from the cap extends through the top of the deck is adapted for engagement by a hoist, whereby the load of the apparatus is borne by the cap and clevis in a hoisting operation, a manhole in the deck allowing access to the column, and rung elements mounted on the column along the surface thereof and circuferentially thereof at predetermined points defining a ladder below the deck allowing sheltered descent of a worker from the manhole down the column over any area circumferentially of the column.

3. A shaft jumbo drill apparatus of the character described comprising a vertically disposed elongated hollow column providing an interior chamber sealed at both ends, a deck centrally mounted atop the column, a plurality of boom-drill sets suspended from the underside of the deck in concentric spaced relation to the column and in equally spaced relation to each other, each boom-drill set having a vertical depending normal position underneath the deck, each boom-drill set including a pneumatically powered tool, pressure air supply piping having an inlet connection to the upper end of the column, a plurality of outlet taps from the column arranged about its mid-area, each outlet tap being fitted with a hand control valve having a hose connection with a separate one of the pneumatically powered tools and disposed out of physical reach from the ground and from the deck, ladder means formed upon the column and disposed wholly below the expanse of the deck in close extended relation to the column enabling access from the ground to the valve control of each outlet tap, and a manway through the deck allowing access from the deck to the ladder means.

4. A shaft jumbo drill apparatus as in claim 3, wherein a plurality of leg means extending angularly away from the column and beyond the bottom end of the column into abutment with the ground support the column in vertical position so that its bottom end is spaced above the ground, and wherein further valve controlled outlet taps are provided adjacent the bottom end of the column within manual reach of a worker on the ground and are adapted for hose connection with pneumatically powered tools for work operations directly below the column.

5. A shaft jumbo drill apparatus as in claim 3, wherein each boom dirll set has a swivel mounting arrangement with the deck, characterized by a bearing bracket secured to the underside of the deck, a vertical stub axle rotatable in the bearing bracket, a horizontal swivel plate secured upon the axle for rotation therewith as a unit, and means pivotally securing the boom-drill set to the underside of the swivel plate for rotation with the latter as a unit and for angular pivot movement in a vertical plane independently of rotation of the swivel plate.

6. A shaft jumbo drill apparatus as in claim 5, wherein the bearing bracket has an annular brake drum and the swivel plate supports hydraulically operable brake means cooperable with the brake drum for effecting a braking action of the swivel plate.

7. A shaft jumbo drill apparatus as in claim 6, wherein a distribution unit is located on the boom drill set relatively distant above the ground surface out of physical reach from the ground for controlling flow of hydraulic operating fluid to the brake means, and hand operable control wire means for operating the distribution unit is supported on the drill set relatively close to the ground.

8. A shaft jumbo drill apparatus of the character described including a horizontal a deck, a supporting column depending centrally from the deck and a plurality of leg means supporting the column in erect position, wherein each leg means comprises a leg member pivotable from a position angularly disposed relative to the column to a depending vertical position adjacent the column, a bracket pivotally supporting an upper end of the leg to the column, and a brace disposed at right angles to the lower end of the column having one end pivoted to the leg and its opposite end detachably supported to the column; wherein the bracket is characterized by a pair of parallel plates extending radically from the column, a pivot pin supported between the plates, and by a thick block piece having a rear wall fixed in parallel abutment with the column and having an undersurface inclined upward above the pivot pin; and wherein the upper end of the leg is pivoted on the pivot pin between the plates, and is characterized by a flat end surface formed at right angles to the longitudinal axis of the leg and adapted to abut flush with the undersurface of the block piece upon pivoting of the leg member from a vertical position outwardly to the said angularly pivoted position.

9. In a shaft jumbo drill apparatus including a deck, means supporting the deck in an elevated horizontal plane, and including at least one boom-drill set having a boom, a drill tool mounted to the boom, and a hydraulically powered jack for shifting the boom in a specific plane; means mounting the boom-drill set to the deck, characterized by a mounting plate removably fastened to the underside of the deck, a bearing cylinder having a vertical axis and depending integrally from the mounting plate, a vertical shaft retained for rotation in the cylinder on a vertical axis and projecting at its lower end slightly below the cylinder, a horizontal swivel plate mounted to the projecting end of the shaft for rotation together with the latter, means pivoting one end of the jack to the underside of the swivel plate for angular movement in a vertical plane and means pivoting the opposite end of the jack to the boom, means pivoting the boom at its upper end to the underside of the swivel plate for angular movement in a vertical plane with the jack, and the boom having a depending vertical normal position relative to the swivel plate.

10. Means as defined in claim 9, wherein the mounting plate includes an annular wall depending in coaxial spaced relation to the shaft; and wherein hydraulically operable brake mechanism is carried by the swivel plate and is cooperable with the annular wall to brake rotation of the swivel plate.

11. In a shaft jumbo drill apparatus of the character described including a deck, means supporting the deck above the ground in a horizontal position, and a plurality of boom-drill sets depending from the underside of the deck relatively close to each other, wherein each boom-drill set includes a plurality of hydraulically operable elements; an elevated hydraulic fluid system for conducting hydraulic operating fluid to the said elements, wherein the system is above the ground and out of physical reach of workers upon the ground and yet wherein operating hydraulic flow to the various elements is subject to manual control by the workers upon the ground, comprising a common hydraulic fluid source located above the deck, a hydraulic fluid distribution unit mounted to each boom-drill set out of physical reach of workers upon the ground, manifold piping mounted to the deck and connected to the source, a separate supply hose line connecting the manifold piping directly with each distribution unit, a plurality of upwardly extending hose lines communicating each distribution unit with the various hydraulically operable elements of the associated boom-drill set, valve mean incorporated in each distribution unit for controlling operation of the latter, elongated wire elements associated with each boom-drill set connected for actuating the related valve means, and lever elements located within reach of workers upon the ground below the deck connected for operating the wire elements.

12. In a shaft jumbo drill apparatus of the character described including a deck, and means supporting the deck above the ground; a plurality of boom-drill sets depending from the underside of the deck, wherein each boom-drill set has a swiveled connection with the deck and includes on hydraulically operable brake for braking swivel action of the boom-drill set, a boom pivotally supported to the swiveled connection and having an hydraulically extensible member carrying a drill tool, and an hydraulically operable jack pivotally supported at one end to the swiveled connection and at the other to the boom for actuating the latter on its pivot; a common source of hydraulic fluid mounted to the deck, and an individual hydraulic flow system elevated out of physical reach from the ground for communicating operating hydraulic fluid from the source to the brake, to the extensible member, and to the jack of each boom drill set; and remotely operable control means associated with each hydraulic flow system for controlling fluid flow therethrough.

13. In a shaft jumbo drill apparatus as in claim 12, wherein each hydraulic flow system includes a hydraulic fluid distribution unit mounted to the boom of the associated boom-drill set and having hose lines connecting the common source with the associated brake, with the extensible member, and with the jack, and wherein the remotely operable means is characterized by valve means in the distribution unit controlling hydraulic flow therethrough, wire elements extended down the associated boom connected for actuating the valve means, and lever elements connected to the free ends of the wire elements at the lower end of said boom for actuating the wire elements.

14. A jumbo drill apparatus for drilling a deep shaft, comprising an elongated relatively narrow hollow column, sealing means closing over each end of the column whereby a reservoir is provided by the interior of the column, a deck of relatively broad expanse as compared to the diameter of the column fixed at its center and in a horizontal plane atop the column, a normally covered manhole in the deck providing access to the column, a plurality of rung elements mounted below the expanse of the deck at predetermined points on the exterior surface of the column providing a means of descent from the manhole along the column to the ground below, a pressure air supply pipe projecting down from above the deck having an inlet connection with the upper end of the reservoir, a plurality of outlet taps from the reservoir located along the column below the deck, each tap having a hose line fitting adapted for connection with a pneumatically powered drill whereby work operations may be effected below the deck in a shaft in which the apparatus is disposed, and clevis means affixed centrally of the deck adapted for connection with a cable hoist whereby the apparatus may be lowered and raised as needed into the shaft.

15. A jumbo drill apparatus as in claim 14, including a group of four leg elements mounted to the column in equally spaced circumferential relation and having their free ends extending angularly away from the column beyond the bottom end of the latter and into abutment with the ground to support the column in erect position and elevated above the ground whereby the full support of the apparatus is borne by the legs.

16. A jumbo drill apparatus as in claim 15 wherein each leg element is disposed angularly in a vertical plane lying midway between adjacent corners of the deck, and the apparatus further including a horizontal swivel plate having a swivel connection with the underside of the deck at a corner of the deck for rotation about a vertical axis, a drill boom pivoted at its top end to the underside of the swivel plate for and having a depending normal vertical position below the deck, the boom being pivotable angularly in a vertical plane from its vertical normal position, hydraulic jack means pivoted at its upper end to the swivel plate and connected at its bottom end to the boom for swinging the boom angularly outward to a degree greater than the angle of disposition of the leg elements relative to the column, the point of connection of the bottom end of the jack means with the boom lying proximate to the line of inclination of the neighboring legs and adapted to clear such line upon swinging of the boom to said degree outwardly, whereby upon rotation of the swivel plate when the boom is so angularly moved the latter is adapted to be swung clear of the next neighboring leg element.

17. A shaft jumbo drill apparatus of the character described including a deck, a supporting column depending centrally from the deck and a plurality of leg means supporting the column in erect position, wherein each leg means comprises a leg member pivotable from a position angularly disposed relative to the column to a vertical position, a bracket pivotally supporting an upper end of the leg to the column, and brace disposed at right angles to the lower end of the column having one end pivoted to the leg and its opposite end detachably supported to the column; wherein the bracket is characterized by a pair of parallel plates extending radially from the column, a pivot pin supported between the plates, and by a thick block piece having a rear wall fixed in parallel abutment with the column and having an undersurface inclined upward above the pivot pin; wherein the upper end of the leg is pivoted on the pivot pin between the plates, and is characterized by a flat end surface formed at right angles to the longitudinal axis of the leg and adapted to abut flush with the undersurface of the block piece upon pivoting of the leg member from a vertical position to the said angularly pivoted position, wherein the brace is foldable upward to a position in close parallel relation to the leg member subsequent to detaching the said other end of the brace, and a wrap-around chain is carried by the leg member for securing the brace in its folded condition to the leg; wherein a removable pin supports the said other end of the brace to the column, and chain means is arranged for suspending the pin to the column after removal of the pin; wherein a clevis is affixed to the top end of the column and projects vertically and centrally through the deck for attachment to a cable hoist, a plurality of boom-drill sets are suspended from the underside of the deck in concentric spaced relation to the column and in equally spaced relation to each other so that the boom-drill sets have a balanced arrangement about the deck and the latter maintains a level condition during lifting of the apparatus by the hoist; and wherein the leg members subsequent to folding of the braces are adapted to pivot to vertical position in parallel relation to the column as the apparatus is hoisted upwards.

References Cited in the file of this patent

UNITED STATES PATENTS

| 53,305 | King | Mar. 20, 1866 |
|---|---|---|
| 412,989 | Sixsmith | Oct. 15, 1889 |
| 495,781 | Carlson | Apr. 18, 1893 |
| 539,475 | Githens | May 21, 1895 |
| 1,485,302 | Sharp | Feb. 26, 1924 |
| 1,517,825 | Bruneau | Dec. 2, 1924 |
| 1,574,894 | Jansson | Mar. 2, 1926 |
| 2,104,341 | Curtis | Jan. 4, 1938 |
| 2,143,848 | Gilman | Jan. 17, 1939 |
| 2,330,228 | Hurley | Sept. 28, 1943 |
| 2,544,030 | House | Mar. 6, 1951 |
| 2,675,996 | Gunning | Apr. 20, 1954 |
| 2,740,610 | Gatti | Apr. 3, 1956 |
| 2,823,899 | Bain | Feb. 18, 1958 |

FOREIGN PATENTS

| 255,521 | Great Britain | July 21, 1926 |

UNITED STATES PATENT OFFICE
CERTIFICATE OF CORRECTION

October 30, 1962

Patent No. 3,061,023

Donald F. Samhammer et al.

It is hereby certified that error appears in the above numbered patent requiring correction and that the said Letters Patent should read as corrected below.

Column 11, line 39, for "adapated" read -- adapted --; line 66, after "drill" insert -- units --; column 12, line 64, strike out "a", second occurrence; column 13, line 71, for "on" read -- an --.

Signed and sealed this 28th day of September 1965.

(SEAL)
Attest:

ERNEST W. SWIDER
Attesting Officer

EDWARD J. BRENNER
Commissioner of Patents